United States Patent
Rader et al.

(10) Patent No.: US 6,849,287 B1
(45) Date of Patent: Feb. 1, 2005

(54) LIGHT STABLE HOP FRACTION AND METHOD OF MAKING THE SAME

(75) Inventors: Sydney R. Rader, Fredonia, WI (US); John R. Seabrooks, Richfield, WI (US); David S. Ryder, Mequon, WI (US)

(73) Assignee: Miller Brewing Company, Milwaukee, WI (US)

( * ) Notice: Subject to any disclaimer, the term of this patent is extended or adjusted under 35 U.S.C. 154(b) by 148 days.

(21) Appl. No.: 09/698,661

(22) Filed: Oct. 27, 2000

Related U.S. Application Data

(60) Provisional application No. 60/162,321, filed on Oct. 28, 1999.

(51) Int. Cl.[7] .............................. C12C 3/00; C12C 3/08
(52) U.S. Cl. ........................ 426/600; 426/29; 426/592
(58) Field of Search .......................... 426/29, 592, 600, 426/11, 16

(56) References Cited

U.S. PATENT DOCUMENTS

| | | | |
|---|---|---|---|
| 4,104,409 A | * 8/1978 | Vitzthum et al. | ........... 426/386 |
| 4,767,640 A | 8/1988 | Goldstein et al. | ........... 426/600 |
| 5,523,489 A | 6/1996 | Ting et al. | ................... 568/347 |
| 5,767,319 A | 6/1998 | Ting et al. | ................... 568/347 |
| 5,783,235 A | 7/1998 | Ting et al. | ..................... 426/16 |
| 5,874,633 A | 2/1999 | Ting et al. | ................... 568/347 |
| 5,972,411 A | 10/1999 | Goldstein et al. | ........... 426/600 |

FOREIGN PATENT DOCUMENTS

| | | | |
|---|---|---|---|
| EP | 0 339 147 A1 | 11/1989 | ............. C12C/3/00 |
| GB | 1082725 | 9/1967 | ............. C12C/3/00 |

* cited by examiner

Primary Examiner—Curtis E. Sherrer
(74) Attorney, Agent, or Firm—Quarles & Brady LLP

(57) ABSTRACT

An extremely light stable, kettle hop flavoring agent is disclosed. The flavoring agent is made by extracting hop solids with a polar solvent and washing the extract with a nonpolar solvent capable of removing residual α-acids. The flavoring agent can be used to impart extremely high light stability and full kettle hop flavoring to malt beverages.

7 Claims, No Drawings

LIGHT STABLE HOP FRACTION AND METHOD OF MAKING THE SAME

CROSS-REFERENCE TO RELATED APPLICATIONS

This application claims priority to U.S. provisional application Ser. No. 60/162,321 filed Oct. 28, 1999.

STATEMENT REGARDING FEDERALLY SPONSORED RESEARCH AND DEVELOPMENT

Not applicable.

BACKGROUND OF THE INVENTION

1. Field of the Invention

The present invention generally relates to light stable hop fractions. More particularly, it relates to novel methods of preparing such light stable hop fractions and methods of preparing hop flavored beverages using such light stable light fractions.

2. Background of the Art

Hops, in the form of either the ground dried plant or pellets, are used in brewing to give the beverages, such as beer or ale, their characteristic bitter flavor and pleasant aroma. The hops usually are added to the boiling wort in the brewing kettle. Alternatively, if primarily a bitter flavor is desired, a hop extract can be added to the brewing kettle or an isomerized hop extract, if it is highly purified, may be added post kettle, i.e., after the wort has been boiled or after fermentation.

The primary hop constituents which are utilized in the brewing process are the alpha acids, the beta acids, the uncharacterized resins and the hop oils. The alpha acids are known as humulones and the beta acids are known as lupulones. The alpha acids are the precursors of the bitter substances in beer. The beta acids or lupulones have low solubility in wort and beer and they are believed to play a relatively minor role in the brewing process.

During brewing, chemical changes are made in the alpha acids or humulones resulting in the formation of compounds known as iso-alpha acids, i.e., isohumulone, isocohumulone and isoadhumulone. The alpha acids are extracted from the hops by the boiling wort and isomerized to the iso-alpha acids during the kettle boiling stage.

It is known that iso-$\alpha$-acids derived from hops (or an unreduced hop extract which contains iso-$\alpha$-acids) can cause light instability in malt beverages. The exposure of such a beverage to light can result in the beverage becoming "light struck" and having a skunky odor. As a result, such beverages cannot be packaged in clear or green glass bottles without a risk of developing the "light struck" character. Light stable beers that can be packaged in clear or green glass bottles are made using reduced hop extracts (i.e., tetrahydroiso-$\alpha$-acids).

Hop extracts have been used in brewing beer for a number of years. The reasons are several-fold. When whole hops are added to the kettle, the yield of iso-alpha acids is poor, e.g., 10–25% based on the alpha acids present in the hops. However, the conversion of alpha acids in a hop extract to iso-alpha acids can be very high, e.g. 80%. Furthermore, the utilization of the pure iso-alpha acids in a preisomerized extract which is added post kettle is known to be extremely high, e.g. 70–90%.

The production of hop extracts usually consists of extracting the essential bittering acids (e.g., $\alpha$-acids, $\beta$-acids, etc.) from the cellulosic material of the hop blossom by the use of either organic solvents or carbon dioxide. The hop extracts thus obtained can be added to the brewing kettle or chemically processed to isomerize and reduce the alpha acids. The residues from such an extraction are generally referred to as "spent hops" (but are hereinafter referred to as "hop solids") and they are typically discarded or sold as animal feed.

We have discovered that one disadvantage of adding hop extracts to the wort in the kettle is that the beer produced lacks the full flavor and aroma produced when whole hops are added to the wort in the kettle. As a result, fermented beverages, such as beer, which have been prepared using hop extracts, although they may have the bitterness of beverages prepared from whole hops, do not have the same full hop flavor as fermented beverages made with whole hops. However, the use of whole hops to obtain the full hop flavor results in a very bitter tasting beverages which may not be desired.

There are other disadvantages to using hop extracts. For example, the use of a $CO_2$ or hexane hop extract does not produce a light stable or fully kettle hopped beverage. Also, use of a processed $CO_2$ hop extract (reduced hop extracts) does not produce a fully kettle hopped beverage. It would be advantageous to have a method of preparing less bitter, fermented beverages having the same "full hop flavor" as fermented beverages prepared with the use of whole hops. It would also be advantageous to have a method of making such a beverage which has light stability equal to or better than a beverage made with reduced hop extracts (i.e., tetrahydroiso-$\alpha$-acids).

U.S. Pat. Nos. 4,767,640; 5,523,489; 5,783,235; 5,874,633; 5,767,319 and U.S. patent application Ser. Nos. 09/111,622; 08/892,898; 08/672,795; 08/659,807; 08/838,217 disclose various hop fractions including hop solids and extracts thereof. These patents and applications are all assigned to the assignee of the present invention. The above-identified patents and applications are hereby incorporated by reference as if fully set forth herein.

Malt beverages made with the hop solids (or extracts thereof) disclosed in the above-referenced patents and applications are generally considered to be light stable.

However, the inventors have found that such malt beverages can still develop off-flavors and aromas when exposed to light. Such light instability is due to the presence of residual $\alpha$-acids in the hop solids. In the presence of light iso-alpha-acids (isomerized from $\alpha$-acids during kettle boil) form a compound known as 3methyl-2-butene-1-thiol (hereinafter "3M2B1T"), which is perceived at very low levels as "skunk" off-flavor and aroma. Hence, traditionally hopped beer packaged in a clear or green glass bottle is not light stable.

One traditional method to avoid this light instability was to remove the bittering components or alpha acids from whole hops and chemically alter them in a way so that they cannot form 3M2B1T which then results in light stability of the subsequent product. However, a drawback of hopping a malt beverage with such a chemically altered whole hops is that "kettle hop" flavor and aroma are missing. In this regard, as noted in the above-reference patents and applications, hop solids, a previously discarded byproduct, have great value because they contain the precursors of "kettle hop" flavor and aroma (sometimes referred to as desirable fruity/estery components, which are typically formed during fermentation). However, the inventors have discovered that such hop solids or their extract have enough residual $\alpha$-acids to affect the light stability of malt beverages.

The inventors have discovered that the sensory threshold for 3M2B1T is as low as one part per trillion (w/w) (1 ppt) in a malt beverage. A method of directly determining 3M2B1T can be found in Goldstein, et al., 51 *J. Am. Soc. Brew. Chem.* 7–74 (1993). The inventors have now surprisingly discovered that a hexane-washed extract of hop solids will product a malt beverage of unexpectedly superior light stability while lending a kettle hop flavor to the finished malt beverage.

It is important to note that the "full" or "kettle" hop flavor refers to the flavor derived from whole hops or hop pellets after fermentation, not the original aroma of whole hops, hop pellets, $CO_2$ hop extract, or even hop character fraction.

BRIEF SUMMARY OF THE INVENTION

The primary objects of the present invention are to disclose methods of preparing extracts of hop solids and the extracts of hop solids thus obtained.

It is the primary object of the present invention to disclose a method of preparing a hop flavored, fermented beverage which has the full hop flavor of a fermented beverage prepared from whole hops, but which is less bitter than the beverage made using whole hops and which is surprisingly light stable.

We have discovered that a nonpolar solvent-washed extract of hop solids can be used as the sole hopping material, to prepare a novel fermented beverage having a full hop flavor, little bitterness, and exceptional light stability.

It is a further object to disclose methods for preparing a fully kettle hop flavored beverage using the novel extracts of hop solids.

As previously mentioned, hop solids are those solids which remain after substantially all of the alpha acids, beta acids, and hop oils have been removed from hops by a solvent, preferably using liquid or supercritical carbon dioxide ($CO_2$).

It is a further object to disclose novel flavoring agents which comprise a nonpolar solvent-washed extract of hop solids.

The method of the present invention for making a light stable, fully kettle hop flavored beverage comprises adding to a fermentable growth media, prior to bio-conversion, (e.g., prior to or during kettle boil, or post knock out) a nonpolar solvent-washed extract of hop solids as the sole hopping material; and bio-converting the media to form a hop flavored beverage. Another aspect of the present invention provides a hop flavored beverage prepared by the foregoing method.

A further aspect provides a hop flavored beverage prepared by adding to a fermentable growth media, prior to bio-conversion, a nonpolar solvent-washed extract of hop solids as the sole hopping material, and then bio-converting the media to the hop flavored beverage.

Another aspect of the present invention provides a hop flavoring agent for beverages comprising a nonpolar solvent-washed extract of hop solids. Preferably, a nonpolar solvent like carbon dioxide or hexane is used for the extraction of whole hops to produce the hop solids. The extraction of the hop solids is preferably accomplished by using a polar solvent.

The polar solvent can be selected from the group consisting of water, ethanol, isopropanol, methanol, dichloromethane, trichloromethane, n-butanol, ethylacetate, ethylene dichloride, and trichloroethylene, or mixtures thereof. Most preferably the polar solvent is ethanol or water, or mixtures thereof.

A final aspect of the present invention provides a hop flavoring agent for beverages comprising a nonpolar solvent-washed water extract of hop solids.

Important advantages of the present invention are that it makes possible the preparation of an extremely light stable, fully kettle hop flavored beverage which was previously unavailable and that such a beverage can be prepared using a byproduct of hop solids which is itself an inexpensive and previously discarded byproduct.

DETAILED DESCRIPTION OF THE INVENTION

To determine the scope and effectiveness of the present invention experimental work was performed using a hexane-washed and alkali-treated water extract of hop solids derived from Cascade whole hop pellets. Each fraction was evaluated for its contribution to kettle hop flavor. As a result, it was found that the extract of hop solids most effectively imparts a conventional full hop flavor to beer. The results of sensory evaluation confirmed that beverages made with the claimed extracts of hop solids had a hop flavor similar to that of beverages made using hop pellets. The tests also confirmed that the beer made with the claimed extracts of hop solids could be packaged in the clear white (flint glass) or green bottles.

The hop solids for use in the invention are the spent hops which remain after substantially all of the alpha acids, beta acids, and hop oils have been extracted (in whole or in part) from whole hops with a non-polar fluid, such as liquid carbon dioxide, supercritical carbon dioxide, hexane, or the like. Generally, hop solids can be the residue remaining after any extraction of hops to remove substantially all of the alpha acids, beta acids, and/or hop oil.

The hop solids, alpha-acids and Hop Character Fraction (HCF) can be obtained from whole hops by a process that can be illustrated as follows:

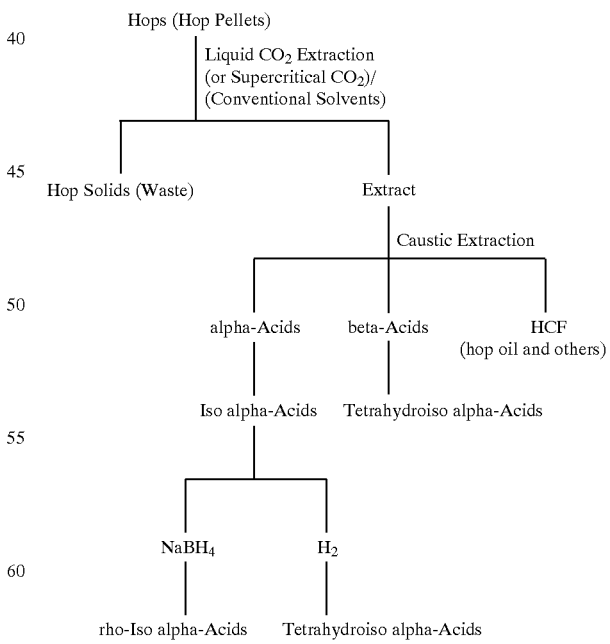

In accordance with the present invention, the hop solids are treated as follows so that a light stable extract is obtained:

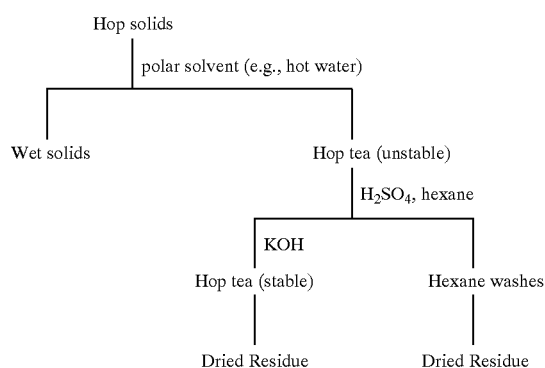

The following is a brief description of the experimental tests performed and the materials employed.

Description Of The Preferred Embodiments

By a fermentable growth media we mean (1) a conventional wort, or (2) any minimal media containing Difco yeast N base (0.8–8 g/l, preferably 1.7 g/l) and glucose (1–20% by weight, preferably 8–10%), or any combination of (1) and (2). By bio-converting or fermentation we mean a process whereby the extracts of hop solids are converted to kettle hop flavor where the yeast is at a fermentable temperature and glucose is present.

EXAMPLE 1

200 g of Cascade hop solids was extracted with 3000 g of hot water which yielded 1363 g of wet hop solids and 1731 g of a hot water extract (hop tea). This hop tea did not produce a light stable malt beverage.

The light unstable hop tea was then cooled to room temperature (the hop tea can be cooled to room temperature or below) and was then adjusted to a pH of 2 with 6.0 ml concentrated $H_2SO_4$ and then washed with 100 ml hexane, seven times. The pH adjustment of the hop tea to the acid side is done to place the α-acids in their free acid form so that they can readily be extracted by the hexane. The hexane fraction can then be dried to obtain a hexane-soluble residue.

The hexane-washed hop tea was then treated with 118 ml 10% w/w KOH to adjust the pH to 6.5 (any alkali would be suitable for adjusting the pH). This yielded 695 g of a light stable (α-acid free) hop tea. The light stable hop tea can be stored frozen or dried. If dried, the light stable hop tea can be lyophilized. The light stable hop tea can then be added to the wort of a malt beverage to make an extremely light stable, fully kettle hopped beverage. The pH adjustment of the washed hop tea to the neutral region is done so that its subsequent addition to wart does not upset the pH balance of the wort. However, if one desired to store the washed hop tea it may be preferable to leave the washed hop tea at a low pH to discourage microbial growth.

It is preferred that a non-polar solvent like $CO_2$ or hexane be used to extract the whole hops or hop pellets. It is most preferred that liquid or supercritical $CO_2$ be used. If a polar solvent (like ethanol, water, etc.) is used to extract the whole hops or hop pellets, an undesirably higher residual amount of alpha acids remains in the hop solids. Also, using a polar solvent to extract the hops results in a depletion of the critical kettle hop flavor components in the hop solids. Thus, it is critical that a non-polar solvent like $CO_2$ be used to extract the whole hops.

It is also preferred that a polar solvent be used to extract the hop solids. Most preferably the polar solvent is ethanol or water. If water is used, it is preferred that the water be hot. If hot water is used, the water should be between 140° F. and 212° F., more preferably from 160° F. to 200° F., and yet more preferred about 180° F. The polar extraction solvent also can be a mixture of ethanol and water in any combination. The use of a polar solvent results in the extraction of the most desirable kettle hop flavor components from the hop solids. In contrast, using a non-polar solvent to extract the hop solids would leave behind important kettle hop flavor components.

The invention provides for washing the hop solids extract (obtained from the extraction of hop solids with a polar solvent) with a nonpolar solvent capable of removing residual α-acids from the hop solids extract. Preferably, the nonpolar solvent is hexane.

Although Example 1 utilized seven hexane washes, fewer such washes should be sufficient. In this regard, the concentration of α-acids in the unwashed hop solids extract would typically be about 100 mg/L. However, the concentration of α-acids in the nonpolar solvent-washed extract of hop solids should preferably be less than about 5 mg/L to obtain a light stable extract of hop solids. Thus, the amount of wash solvent and/or the number of washes can be readily adjusted to achieve such a target level of α-acids.

The beers made by the practice of the present invention had acceptable taste and foam characteristics, as well as exceptional light stability. Thus, it is possible by the practice of the method of the present invention to prepare a light stable, full hop flavored beer using a nonpolar solvent-washed extract of hop solids.

It will be apparent to those skilled in the art that the method of the present invention, in addition to being novel and useful, is also simple and economical. For example, only conventional brewing techniques and equipment are used and the useful flavoring constituents of the hop solids are not wasted.

The hop solids preferred for use in the method of the present invention are the hop solids obtained after the liquid carbon dioxide extraction of hops under 40° to 80° F. and 500–1000 psig. The liquid carbon dioxide extraction of hops is described in U.S. Pat. No. 4,344,978. Other hop solids that can be used are those obtained by the extraction of hops with supercritical $CO_2$ at a temperature of 100°–150° F. and pressure of 1100–3000 psig., or by the practice of the extraction methods of U.S. Pat. Nos. 3,798,332; 4,002,683; and others.

Representative of the different types of hops that can be used to prepare the hop extract and hop solids are Cascade hops and Galena hops. However, other varieties of hops also can be used.

The amount of the nonpolar solvent-washed extract of hop solids to be added depends upon the amount of kettle hop flavor desired in the resulting beverage. Normally, if the extract of the present invention is to be used alone the amount employed will be equivalent to the equivalent amount of whole hops that would be employed for the same flavor of whole hopped beer.

It will be apparent to those skilled in the art that a number of modifications and changes may be made without departing from the spirit and scope of the invention.

For example, an exhaustive extraction of hop solids with boiling ethanol resulted in about a 28% by weight extract on a dry basis. Also, an exhaustive extraction of hop solids with boiling water resulted in about a 45% by weight extract on a dry basis. Both of these extracts produce a fully kettle hop flavored beverage.

Therefore it is to be understood that the invention is not to be limited by the description and examples but only by the claims which follow,

We claim:

1. A method of making a light stable, kettle hop flavoring agent comprising the steps in the following order:
   extracting whole hops or hop pellets with a first non-polar solvent to produce hop extract and hop solids;
   extracting the hop solids with a polar solvent to form an extract of hop solids;
   acidifying the hop solids extract;
   washing the hop solids extract with a second non-polar solvent capable of removing residual α-acids; and
   recovering the washed hop solids extract;
   wherein the concentration of α-acids in the washed hop solids extract is less than 5 mg/L.

2. The method of claim 1, wherein the polar solvent is water.

3. The method of claim 1, wherein the second non-polar solvent is hexane.

4. The method of claim 1, wherein the washed extract is frozen.

5. The method of claim 1, wherein the washed extract is dried.

6. A method of making a hop flavored beverage from a fermentable growth media comprising the steps of:
   adding to the media, prior to bio-conversion, the hop flavoring agent produced by the method of claim 1; and
   bio-converting the media to form the hop flavored beverage.

7. The method of claim 6, wherein the polar solvent is water and the non-polar solvent is hexane.

* * * * *